Sept. 26, 1950 E. W. MILLER 2,523,913
MACHINE FOR GROOVING GEAR SHAVING CUTTERS WITH
HELICAL DISPLACEMENT OF GROOVES
Filed May 28, 1946 5 Sheets-Sheet 1

Inventor
Edward W. Miller

Sept. 26, 1950 E. W. MILLER 2,523,913
MACHINE FOR GROOVING GEAR SHAVING CUTTERS WITH
HELICAL DISPLACEMENT OF GROOVES
Filed May 28, 1946 5 Sheets-Sheet 4
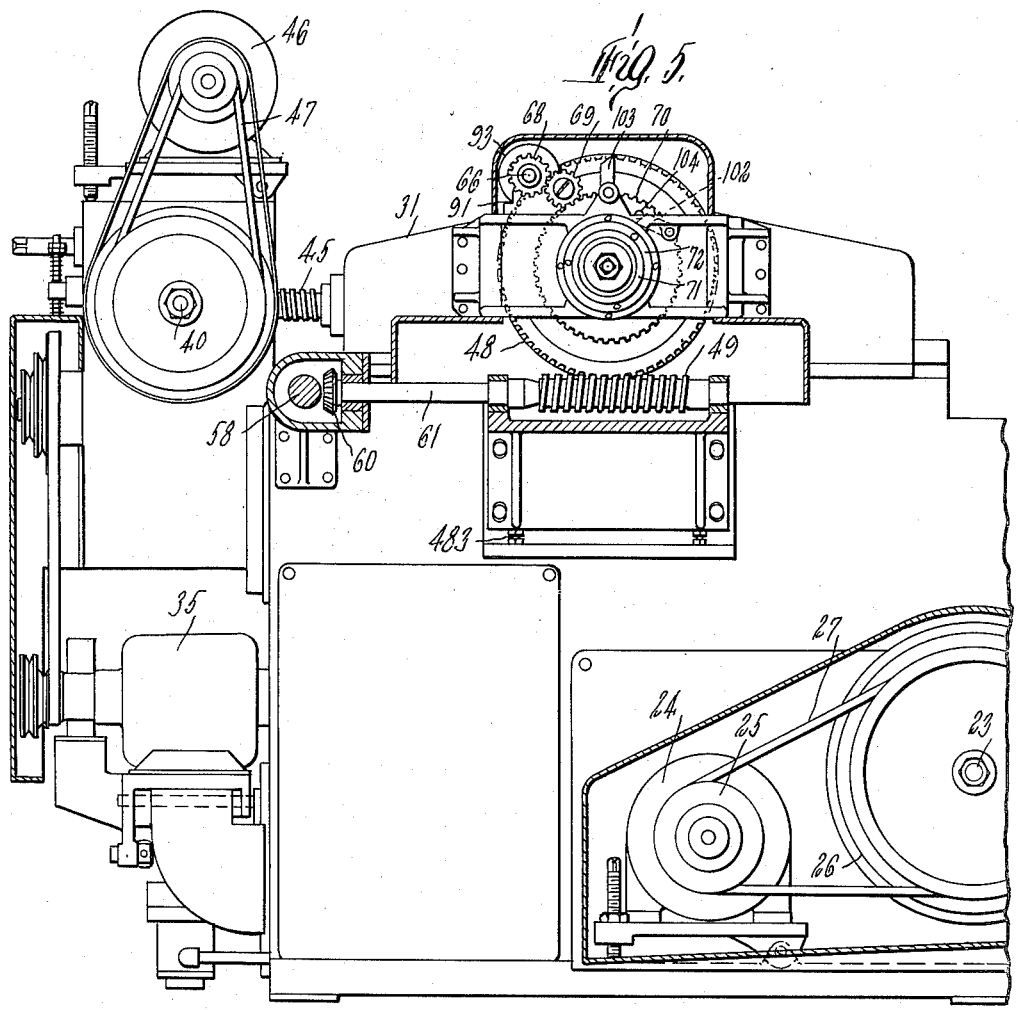
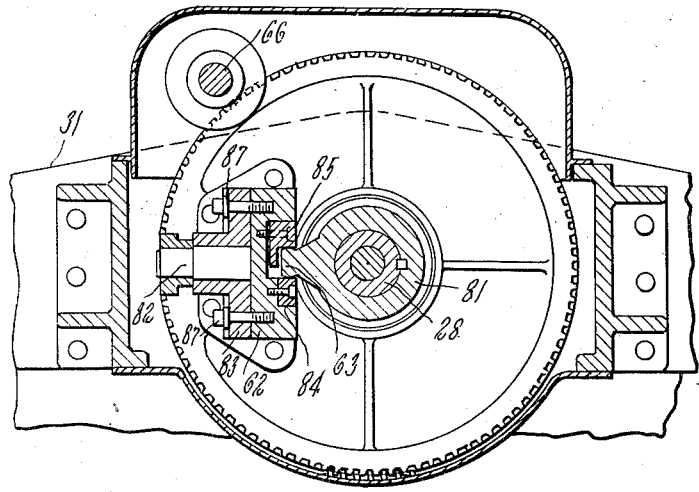

Patented Sept. 26, 1950

2,523,913

UNITED STATES PATENT OFFICE 2,523,913

MACHINE FOR GROOVING GEAR SHAVING CUTTERS WITH HELICAL DISPLACEMENT OF GROOVES

Edward W. Miller, Springfield, Vt., assignor to The Fellows Gear Shaper Company, Springfield, Vt., a corporation of Vermont Application May 28, 1946, Serial No. 672,860

12 Claims. (Cl. 90—8)

1

The present invention relates to machines by which tools known as gear shaving cutters are provided with grooves in the sides of their teeth. Such cutters are similar to spur or helical gears in that they are made with teeth conjugate to the teeth of gears which they are designed to finish and are capable of running in mesh with such gears. They differ from ordinary gears in that they are made of metal of suitable quality to perform cutting and burnishing actions on metal gears, and are formed with grooves in the sides of their teeth so disposed that the intersections of such grooves with the side faces of the teeth form cutting edges.

The object of the invention is to provide means whereby corresponding grooves cut in adjacent teeth of a gear finishing cutter may be spirally or helically disposed around the axis of the cutter. In other words, the object is to provide means in a tooth grooving machine of the character described for effecting a relative displacement between the work piece and a grooving tool, axially of the work piece, after grooves have been cut in any tooth, and before the commencement of cutting grooves in the next tooth, by a prescribed amount to the end that the cutting edges of a following tooth will revolve in planes other than those in which the edges of the preceding tooth revolve, when the shaving cutter is rotated in performing its appointed function. A part of this object is to dispose the grooves and cutting edges in such fashion that the number of planes in which the several cutting edges revolve may be a large multiple of the number of grooves cut in one side of any one tooth, and may be as large as the number of such grooves multiplied by the number of teeth. The accomplishment of these objects results in a mode of cutting by the shaving tools so made, and a quality of finish produced in the work gears on which such tools operate, which is superior to the results obtainable by shaving cutters of which corresponding edges of the several teeth revolve, or track, in the same planes perpendicular to the cutter axis.

In the present disclosure of the invention I have shown and described the new features in which it consists as applied to the finish cutting machine of my pending application Serial No. 606,995, filed July 25, 1945, which is based on and contains the fundamental principles of my earlier application Serial No. 393,554, filed May 15, 1941, on which Patent No. 2,405,159 was granted August 6, 1946. As applied to the particular machine of my above named applications, the invention comprises added means for causing axial displacement of the work spindle in the course

2 of being indexed between cutting actions on successive teeth, together with means for rotating the work spindle at the same time in a measure sufficient to maintain a constant relationship between the sides of the several work piece teeth and the path of the grooving tool when the work piece is a helical shaving cutter. In its more generic aspects the invention comprises the combination of means for effecting relative displacement between the work piece and the grooving tool, axially of the work piece, with means for effecting groove cutting actions and means for indexing the work between cutting actions on successive teeth.

In the accompanying drawings,

Fig. 5 is a rear elevation of a part of the machine with protective covers shown in section;

Fig. 6 is a section on line 6—6 of Figs. 3 and 4;

Like reference characters designate the same parts wherever they occur in all the figures.

Figure 1:
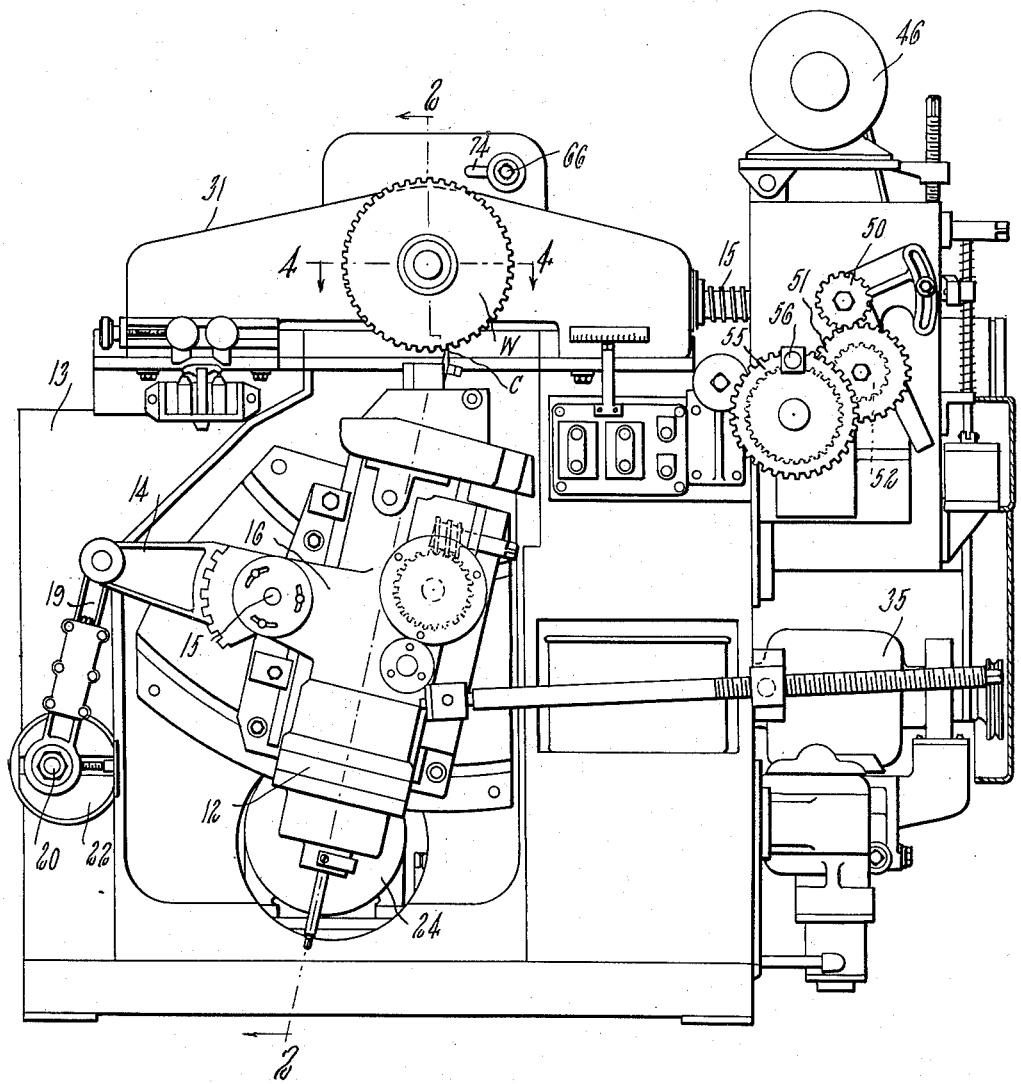
Fig. 1 is a front elevation of a tooth grooving machine such as shown in my application Serial No. 606,995 with the novel features of the present invention applied thereto.
Figure 2:
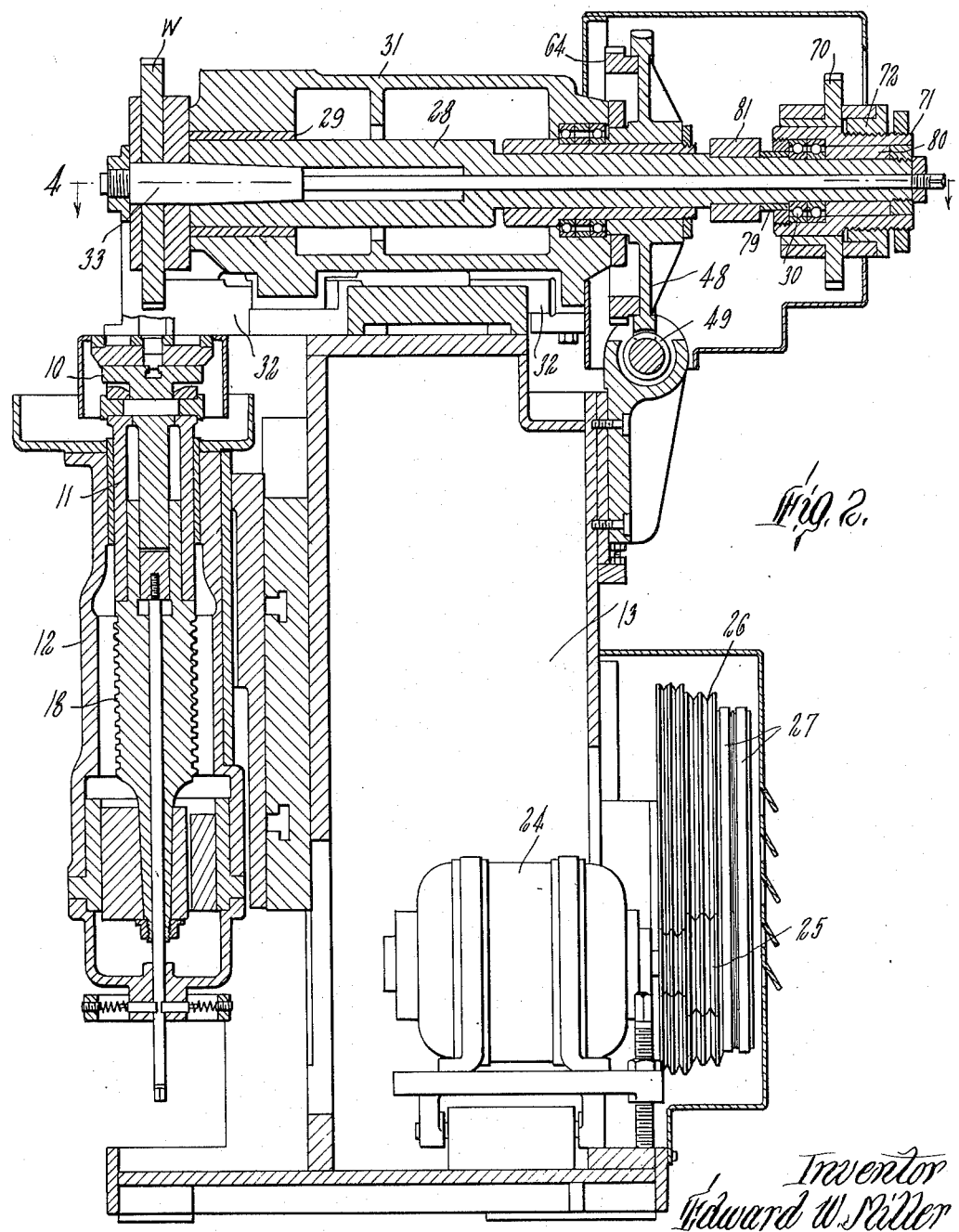
Fig. 2 is a section from top to bottom of the machine taken on line 2—2 of Fig. 1.
Figure 8:
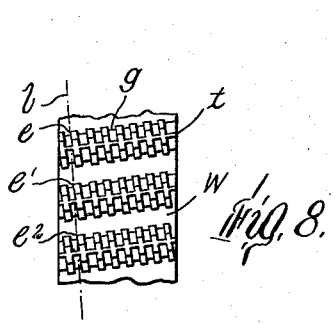
Fig. 8 is a side view of a fragment of gear shaving cutter showing in an exaggerated manner the spiral disposition of grooves cut by means of this machine.
Figure 9:
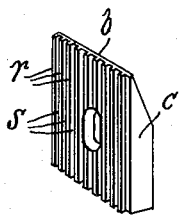
Fig. 9 is a perspective view of the grooving tool which constitutes the cutting element of the machine.

A gear shaving cutter of the kind which this machine is designed to finish is shown in Figs. 1 and 8 designated by the reference letter W. Grooves $g$ are cut in the sides of the teeth $t$ of such cutter by means of a cutting tool, such as that designated C in Fig. 9, which has parallel ribs $r$ and intermediate spaces $s$ in a wide face of the tool, extending to the end boundary $b$ thereof and being there ground to form a cutting edge of crenelated character. In the groove cutting operation, the tool C is reciprocated rapidly in a fixed path while the shaving cutter (which will hereinafter generally be called the work piece), is rolled past the tool with one side of one of the teeth $t$ intersecting the path in which the tool reciprocates. After one tooth has been thus grooved, the work piece is indexed to bring another tooth into the cutting position and again rolled past the grooving tool. When all the teeth of the work piece have been thus grooved on one side, the work piece is placed in reversed position on the work spindle and the series of operations repeated.

In the former commercial practice of this art, corresponding grooves in corresponding sides of all the work piece teeth have been located in the same planes perpendicular to the axis of the work piece. Hence, when the shaving tool is rotated about its axis, without being moved in the axial direction at the same time, corresponding edges all revolve or track in the same plane. Pursuant to the present invention the grooves in different teeth are axially displaced so that corresponding edges, such as $e$, $e'$, $e^2$, etc. on successive teeth lie in a helical alinement as represented in an exaggerated way by the broken line $l$ in Fig. 8. In practice the lead of such helical alinement may be as short as the distance between corresponding edges (for example, the edges $e$ and $e^4$) of two adjacent grooves in the same tooth face. Resulting from such an arrangement, the advancing cutting edges all travel in different planes, the number of which may be as great as the number of grooves multiplied by the number of teeth, and in any event is much larger than the number of grooves in any one tooth face, wherefore the edges of the shaving tool are enabled to impinge on the teeth of a gear which is being shaved at many more points than is done by shaving cutters made according to prior practice.

The means for mounting the grooving tool and reciprocating it here shown are the same as shown in my application Serial No. 609,995. The tool is secured to a cutter head 10 carried by a ram or spindle 11, which reciprocates in a saddle or housing 12 mounted on the front of the machine base 13. Reciprocating movement is imparted to the ram by a lever 14 which turns about a pivot 15, supported by a bracket 16 of housing 12, and has an arm formed with gear teeth on its extremity meshing with rack teeth 18 encircling the ram. Lever 14 is connected by an adjustable connecting rod 19 with a crank pin 20 carried adjustably by a crank disk 22. Said crank disk is carried by a shaft 23 (Fig. 5), which extends from front to rear of the machine and is driven by an electric motor 24 through belt and pulley gearing 25, 26, 27.

The work piece W is mounted on a work spindle 28 which rotates in bearings 29 and 30 in a carriage 31 supported by the machine base 13 in engagement with guides 32 which permit it to reciprocate in a fixed path. An arbor 33 secured to the spindle supports the work piece at the same side of the carriage as the path in which the grooving tool travels and in a position to be acted on by that tool during upward strokes thereof. The tool projects upwardly from the cutter head and is mounted with provision for angular adjustment about an axis extending in its path of travel to correspond with helical work piece teeth of various helix angles, as well as straight teeth of spur gear character.

Figure 10:
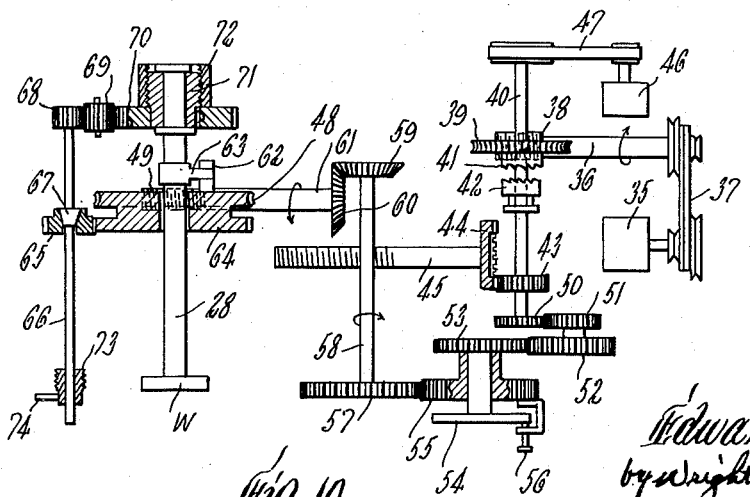
Fig. 10 is a schematic layout of the mechanism by which the moving parts of the machine are actuated and controlled.

The carriage 31 is reciprocated and the work spindle simultaneously rotated to cause the work piece to roll across the extremity of the grooving tool with a tooth at its under side in position to be cut by the tool. A comprehensive view of the mechanism provided for this purpose is shown in Fig. 10. A feed motor 35 drives a shaft 36 by a pulley and belt drive 37. Shaft 36 carries a worm 38 meshing with a worm gear 39 rotatable on a transverse shaft 40. Gear 39 carries a one way clutch element 41 adapted to mesh with a complemental clutch element 42 splined and movable endwise on shaft 40. A spur gear 43 on shaft 40 meshes with a face gear 44 on a screw shaft 45 (see also Figs. 1 and 5), the threads of which mesh with a nut on the carriage 31. This driving train is designed to give a slow progressive movement to the carriage from left to right, with respect to Fig. 1, while grooves are being cut by the tool C. A rapid return movement is imparted by a return motor 46, which is coupled directly to shaft 40 by a belt and pulley transmission 47 and is arranged to rotate that shaft in the opposite direction to the rotation imparted by feed motor 35. The belt of this transmission can slip when shaft 40 is rotated by the feed motor, the return motor being then inactive. Suitable controls, governed by the carriage, are provided for coupling and uncoupling the clutch element 41 and energizing each motor while de-energizing the other.

Rotation is imparted to the work spindle 28 by a worm gear 48 which is coupled to the spindle by means later described. This worm gear meshes with a worm or screw 49, which is mounted parallel to the path in which the carriage moves and is in mesh with the under side of the worm gear. It operates as a rack on which the worm gear rolls when the carriage reciprocates. It is also rotatable to compensate for differences in pitch radius between the worm gear 48 and the work piece, and for indexing the work spindle. Rotation is imparted to the worm 49 from shaft 40 by a train of change gears 50, 51, 52, and 53, a dividing head or disk 54 connected with gear 53, a gear 55 which carries a plunger 56 and is coupled with disk 54 by said plunger 56, a gear 57 on a shaft 58 meshing with gear 55, and a gear pair 59 and 60, the former of which is fast on the shaft 58 and the other is fast on the shaft 61 of worm 49. Plunger 56 can be withdrawn from disk 54 and revolved independently of gear 53, thus rotating gear 55, for indexing the work spindle. When this plunger is coupled with the disk, the worm 49 is rotated reversibly by shaft 40 at a speed ratio determined by the change gears 50—53. The details of the mechanism thus far described are fully shown in my prior application Serial No. 606,995 and need no further description here.

The coupling between the work spindle 28 and worm gear 48 comprises a guide 62 carried by the worm gear and a stud 63 carried by the spindle. The worm gear carries also a coaxially disposed gear 64 meshing with a pinion 65, which is loose on a countershaft 66 and is adapted to be coupled thereto by a clutch 67. The countershaft carries also a pinion 68 in driving connection through an idle pinion 69 with a gear 70 surrounding a screw element 71 and coupled therewith by a spline 711. A nut 72 secured to the carriage meshes with screw 71. Said gear 70, screw 71 and nut 72 surround the tail end of work spindle 28, and the nut and has thrust connection with the spindle to impart endwise movement thereto. Countershaft 66 may be moved endwise to couple clutch 67 with gear 65, and uncouple the clutch, by a screw element 73 which meshes with a stationary nut element, later described, and is rotatable by a handle 74 and is so engaged with the countershaft as to move it endwise when rotated. When clutch 67 is coupled with gear 65, and plunger 56 is rotated to index the work spindle, the gear train 64, 65, 68, 69 and 70 rotates the screw element 71 to impart endwise movement to the work spindle at the same time, the extent of which is determined by the pitch of the screw and the angle through which gear 70 is turned. Mechanical details of the mechanism described in this paragraph are shown in Figs. 3–7.

Figure 4:
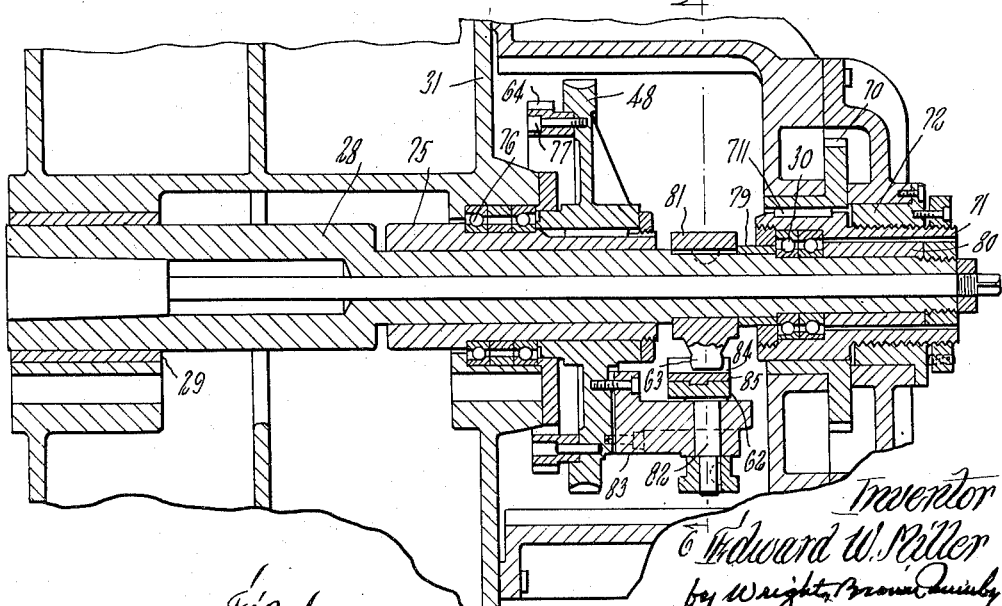
Fig. 4 is a horizontal section on line 4—4 of Figs. 1 and 2.
Figure 7:
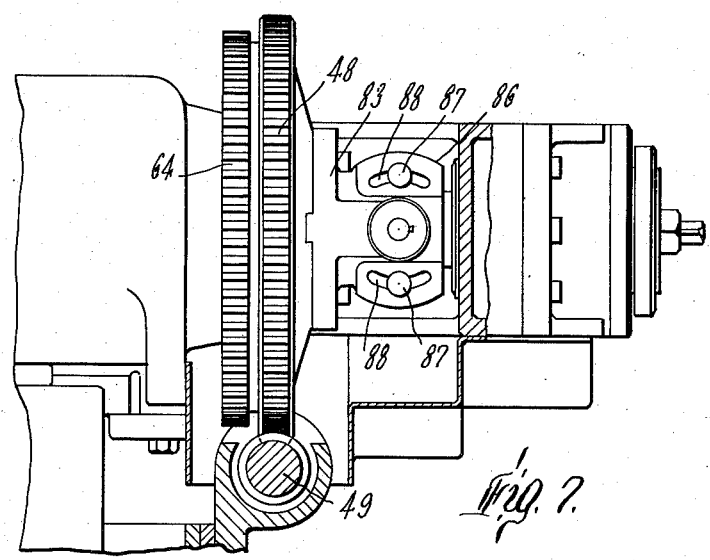
Fig. 7 is a partial section taken on line 7—7 of Fig. 3 and elevation of the parts exposed by such section.

As shown best in Fig. 4, the worm gear 48 is keyed to a sleeve 75, which is supported by a bearing 76 in the carriage and is withheld from endwise movement. The work spindle 28 is free to rotate and move endwise in said sleeve. Gear 64 is made fast by screws 77 to one side of the worm gear.

The gear 70 is splined to the screw 71, which is a sleeve rotatable about the work spindle on bearing 30 which is confined between sleeves 79 and 80 so that it cannot move endwise on the spindle. The nut 72, with which screw 71 is meshed, is secured immovably to the carriage structure.

The stud 63 is here shown as a short arm projecting from a sleeve 81, which is keyed to the work spindle and abuts at one side against a shoulder on the spindle. It serves also as an abutment for the sleeve 79 which abuts on bearing 30. Guide 62, with which stud 63 cooperates, is constituted by a body part, to which the reference character 62 is applied in Figs. 4 and 6, having a shank 82 mounted rotatably in a bracket 83, which is secured to the side of the worm gear opposite to that to which gear 64 is secured. Body member 62 of the guide carries two guide pieces 84 and 85 (Fig. 6) spaced apart to form the boundaries of a channel or guideway in which the extremity of stud 63 is received. The guide piece 85 is adjustable toward and away from guide piece 84 to take up looseness between the sides of the stud and the guideway.

Figure 3:
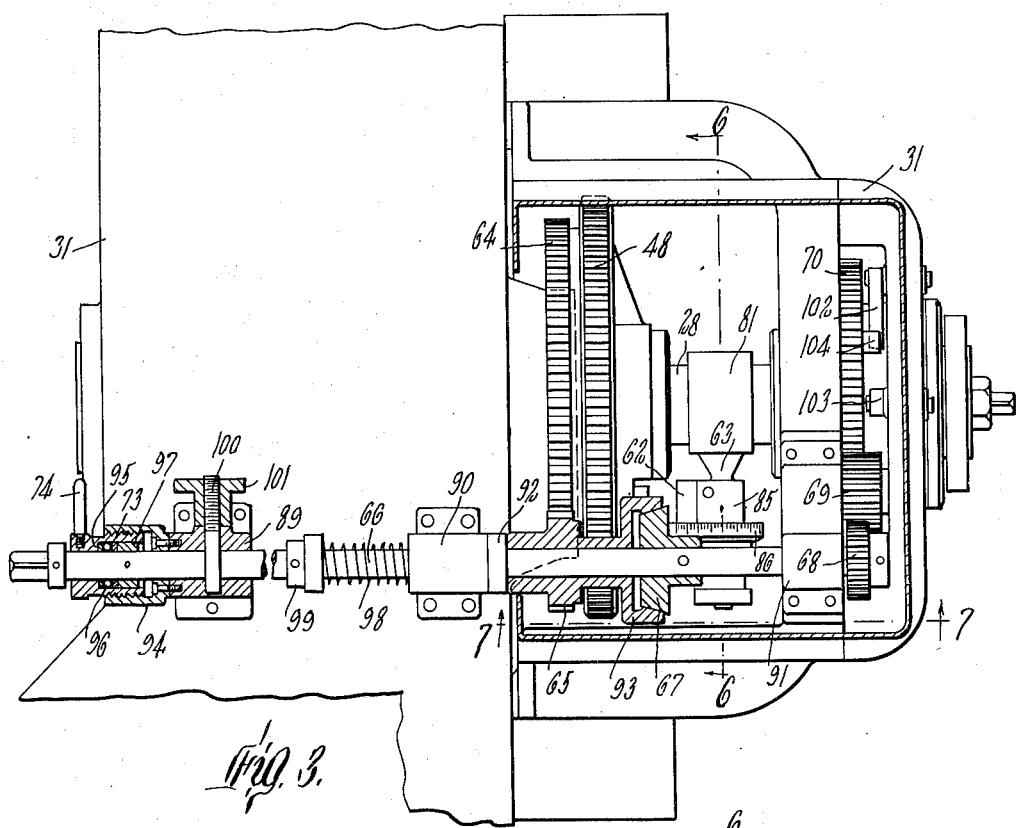
Fig. 3 is a plan view of so much of the machine as shows the new mechanisms of the present invention.

Shank 82 is disposed in the bracket 83 with its axis perpendicular to the axis of the work spindle and the guideway extends crosswise of the axis of the shank. This guide unit can be adjusted in the bracket to place the guideway either parallel to the spindle or at various inclination. An arcuate surface 86 on the bracket 83 bears angle graduations adjacent to an index mark 851 on the guide body 62, as shown in Fig. 3, to show and measure the inclinations at which the guideway is placed with respect to the spindle. Clamp screws 87 (Fig. 7) passing through slots 88 in the bracket, and threaded into the guide body 62, secure the adjustments of the guideway.

The purpose of the guide means just described is to maintain the faces of the successive teeth of the work piece in the same relation to the path of the slotting tool, when the spindle and work piece are axially displaced. When a shaving tool having spur teeth is mounted for slotting, the guideway is set parallel to the spindle axis, and then endwise displacement of the axis causes no change in the angular position of the work piece. But with work pieces having helical teeth, axial displacement without angular compensation would cause the side of the tooth being slotted to overlap the path of the slotting tool more or less, depending on whether the helix is right hand or left hand, when in the cutting position; and in the case of such work pieces the guideway is set at an inclination equal to the helix angle of the teeth and inclined in the direction corresponding to the hand of the tooth helices. Thereby an increment of angular movement is imparted to the spindle, additional to its indexing rotation, which may be in the same direction as, or the opposite direction to, that rotation.

The countershaft 66 is held by bearing brackets 89, 90 and 91 mounted on the top of the work carriage. It is movable rotatably and endwise in such bearing and the clutch 67 and gear 68 are pinned or otherwise secured to it in a manner to prevent independent rotation and endwise movement. Pinion 65 is rotatable on shaft 66 and is withheld from endwise movement by a thrust bearing 92 between it and the bearing 90. It carries a clutch element 93 complemental to clutch 67, as shown by Fig. 3. The idle pinion 69 between gears 68 and 70 is mounted on a pivot secured to bearing bracket 91.

Screw 73 is threaded into a socket 94 secured to bearing bracket 89 and is made with a thrust bearing abutment 95. A thrust bearing 96 is confined between abutment 95 and a collar 97 on the shaft. A spring 98 surrounds shaft 66 in stressed condition between the bracket 90 and an abutment 99 on the shaft, holding the collar 97 against thrust bearing 96 and causing the shaft to move endwise when the screw 73 is backed off. A friction brake 100 is mounted in the bearing bracket 89 in engagement with shaft 66 to prevent rotation of the shaft by the drag of gear 65 when the clutch 67 is disconnected. This brake element is a rod movable endwise through the bearing bracket, having a curved face embracing an arc of the surface of the shaft and being operable by a nut 101 to draw the curved face with more or less pressure against the side of the shaft.

For locating the work in setting up the machine, dogs 102 and 103 (Figs. 3 and 5) are mounted on the work carriage in position to coact with a stud 104 carried by gear 70. Each dog can be placed in the path of stud 104 and moved out of its path. They are mounted in a manner similar to pawls so that each may be placed to prevent rotation of the gear in one direction while permitting the stud to pass it when the gear is rotated in the opposite direction, and they are oppositely disposed with respect to the stud.

In the operation of the machine the rolling movements of the work piece and reciprocating movements of the grooving tool are performed automatically. When the grooving operation has been completed on one tooth, the operator turns the screw element 73 so as to couple the clutch 67 with clutch element 93, disconnects plunger 56 from the dividing head 54, and revolves the plunger through the angle necessary for indexing. He then reengages plunger 56 with disk 54 and turns screw 73 in the direction for disconnecting clutch 67. The automatic grooving operation is then repeated; and this sequence is continued until all the work piece teeth have been finished. Although in this embodiment of the invention the operations of indexing and of coupling and uncoupling clutch 67 are performed manually, it is within my contemplation to provide automatic means for the purpose in combination with the other automatic mechanism by which grooving is performed.

Various and more or less extensive changes may be made in structural embodiments of the principles herein described without departing from the spirit and scope of the invention.

What I claim is:

1. In a machine for grooving the sides of teeth of gear-like work pieces, a work spindle, a gear element rotatable independently of the spindle about the axis thereof and coupled with the spindle for imparting rotation thereto, the spindle being movable endwise relative to the gear element, means for rotating said element to impart indexing movement to the spindle, and means operated by the gear element for imparting an independent endwise movement to the spindle, comprising complemental screw and nut elements, one of which is rotatable and in thrust engagement with the spindle and the other is stationary, and torque-transmitting means between said gear element and the rotatable one of the screw and nut elements.

2. In a machine for grooving the sides of teeth of gear-like work pieces, a work spindle, a gear element rotatable about the axis of said spindle and coupled with the spindle for imparting rotation thereto, the spindle being movable endwise relative to the gear element, means for rotating said element to impart indexing movement to the spindle, and means operated by the gear element for imparting an independent endwise movement to the spindle, the gear element being coupled to the spindle by means including a projection and a guide in which the projection is contained and is relatively movable lengthwise of the guide, said guide being placeable at various inclinations to the axis of the spindle, whereby to impart an increment of rotation to the spindle during its said axial displacement.

3. In a machine for cutting grooves in the sides of teeth of a gear-like work piece, a work spindle mounted rotatably in a supporting structure, a gear element rotatable about the axis of said spindle and with respect to which the spindle is relatively movable angularly and axially, coupling means between the gear element and spindle comprising a projection and a guide, one of which is carried by the spindle and the other by the gear element, said guide having a guideway receiving the projection and in which the latter is movable endwise, and means for effecting an axial displacement of the spindle relatively to the gear element.

4. In a machine of the character described, a supporting structure, a spindle rotatable in said supporting structure, a nut element secured fast to the supporting structure, a screw element having threaded engagement with said nut element and being rotatable relatively to the spindle and engaged therewith to impart endwise movement thereto, a gear element rotatable about the axis of the spindle, coupling means for transmitting angular movement from the gear element to the spindle, means for rotating the gear element, and connections between said gear element and screw element whereby rotation of the gear element turns the screw element.

5. In a machine of the character described, a supporting structure, a spindle rotatable in said supporting structure, a nut element fixed to the supported structure, a screw element having threaded engagement with said nut element and being rotatable relatively to the spindle and engaged therewith to impart endwise movement thereto, a gear element rotatable about the axis of the spindle, coupling means comprising a guide member carried by the gear element having a guideway and a projection carried by the spindle contained in said guideway, the guide member being angularly adjustable to place its guideway parallel to the spindle and at various inclinations thereto, and transmission means between the gear element and screw element for imparting rotary movement to the screw element when the gear element is turned.

6. In a machine of the character described, a supporting structure, a spindle rotatable in said supporting structure, a nut element fixed to the supporting structure, a screw element having threaded engagement with said nut element and being rotatable relatively to the spindle and engaged therewith to impart endwise movement thereto, a gear element rotatable about the axis of the spindle, coupling means comprising a guide member carried by the gear element having a guideway and a projection carried by the spindle contained in said guideway, the guide member being angularly adjustable to place its guideway parallel to the spindle and also at various inclinations thereto, and transmission means between the gear element and screw element for imparting rotary movement to the screw element when the gear element is turned, said transmission means including a disconnectible clutch for making the transmission means operative and inoperative at will.

7. A machine for grooving the side faces of the teeth of gear shaving cutters and the like comprising a supporting structure, a work spindle supported thereby, a grooving tool on the supporting structure, means for effecting a relative rolling movement between the work spindle and grooving tool compounded of rotation around the axis of the spindle and translation transversely of said axis, the tool being arranged to generate grooves in the tooth of a shaving cutter mounted on said spindle in the course of such a rolling movement, indexing mechanism arranged and operable for rotating the spindle so as to present different teeth to the grooving tool, mechanism operated by said indexing mechanism for shifting the spindle endwise, and means for imparting an increment of angular rotation to the spindle additional to its indexing rotation.

8. A machine for cutting grooves in the sides of the teeth of gear-like work pieces comprising the combination with a groove cutting tool, a work spindle adapted to support such a work piece in position to be cut by said tool, and means for effecting relative rolling movement between the spindle and tool, of means for rotating the spindle to index the work piece, a screw element rotatably surrounding the spindle and having end thrust engagement therewith, a stationary nut element with which the screw element is in threaded engagement, and means for rotating said nut element simultaneously with rotation of the spindle, whereby to shift the spindle endwise.

9. A machine for cutting grooves in the sides of the teeth of gear-like work pieces comprising the combination with a groove cutting tool, a work spindle adapted to support such a work piece in position to be cut by said tool, and means for effecting relative rolling movement between the spindle and tool, of means for rotating the spindle to index the work piece, a screw element rotatably surrounding the spindle and having end thrust engagement therewith, a stationary nut element with which the screw element is in threaded engagement, means for rotating said nut element simultaneously with rotation of the spindle, whereby to shift the spindle endwise, and guiding means operatively engaged with the spindle to impart an increment of angular movement thereto in the course of its endwise shifting movement.

10. In a tooth grooving machine, a rotatable and endwise movable work spindle, a countershaft beside the spindle, a gear element coaxial with the spindle and coupled thereto, a gear element on the countershaft meshing with the first named gear element, a screw element rotatable on the spindle having end thrust engagement therewith, a fixed nut element with which said screw element is in threaded engagement, a gear element secured to the screw element, a second gear element on the countershaft in driving relation with the gear element which is secured to the screw element, and means for imparting rotation to the spindle.

11. In a tooth grooving machine a rotatable and endwise movable work spindle, a countershaft beside the spindle, a gear element coaxial with the spindle and coupled thereto, a gear element on the countershaft meshing with the first named gear element, a screw element rotatable on the spindle having end thrust engagement therewith, a fixed nut element with which said screw element is in threaded engagement, a gear element secured to the screw element, a second gear element on the countershaft in driving relation with the gear element which is secured to the screw element, and means for imparting rotation to the spindle, one of the gear elements on the countershaft being loose thereon for independent rotation, and said gear element and the shaft having complemental clutching members operable to make the gear element fast to the shaft.

12. In a tooth grooving machine a rotatable and endwise movable work spindle, a countershaft beside the spindle, a gear element coaxial with the spindle with respect to which the spindle is movable angularly and axially and coupled thereto, a gear element on the countershaft meshing with the first named gear element, a screw element rotatable on the spindle having end thrust engagement therewith, a fixed nut element with which said screw element is in threaded engagement, a gear element secured to the screw element, a second gear element on the countershaft in driving relation with the gear element which is secured to the screw element, and means for imparting rotation to the spindle, the coupling means between the shaft and first named gear element including a guide placeable at an inclination to the spindle, whereby to impart an increment of rotation to the spindle.

EDWARD W. MILLER.

REFERENCES CITED

The following references are of record in the file of this patent:

UNITED STATES PATENTS

| Number | Name | Date |
|---|---|---|
| 692,033 | Rivett | Jan. 28, 1902 |
| 2,278,792 | Mentley | Apr. 7, 1942 |